United States Patent [19]
Ogihara et al.

[11] 3,856,393
[45] Dec. 24, 1974

[54] OPENING DEVICE FOR AN ELECTRONIC SHUTTER

[75] Inventors: Masuo Ogihara; Masanori Watanabe, both of Chiba, Japan

[73] Assignee: Seiko Koki Kabushiki Kaisha, Tokyo, Japan

[22] Filed: May 29, 1973

[21] Appl. No.: 364,237

[30] Foreign Application Priority Data
May 26, 1972 Japan.............................. 47-52309

[52] U.S. Cl................................ 354/258, 354/230
[51] Int. Cl. ............................................ G03b 9/62
[58] Field of Search............ 95/10 CT, 53 R, 53 EB; 354/230, 258, 51

[56] References Cited
UNITED STATES PATENTS
| | | | |
|---|---|---|---|
| 3,513,761 | 5/1970 | Kiper | 95/53 |
| 3,638,544 | 2/1972 | Kitai | 95/53 X |
| 3,645,185 | 2/1972 | Kitai | 95/53 |

*Primary Examiner*—Samuel S. Matthews
*Assistant Examiner*—Michael L. Gellner
*Attorney, Agent, or Firm*—Robert E. Burns; Emmanuel J. Lobato; Bruce L. Adams

[57] ABSTRACT

A camera having an electronic shutter is equipped with an opening device for opening the shutter with a preselected time delay and a closing device for closing the shutter to complete an exposure. The opening device comprises a delay device composed of an inertia wheel connected to a gear wheel and a pivotable gear sector in mesh with the gear wheel, and a lever system engageable with the gear sector of the delay device to effect opening of the shutter. The lever system includes a turnable lever connected to the shutter and coacting with a biasing spring for biasing the turnable lever in a shutter-opening direction and an opening lever in camming engagement with the turnable lever and engageable with the gear sector only after the turnable lever has turned through a given angular distance in the shutter-opening direction to couple the turnable lever to the delay device.

4 Claims; 4 Drawing Figures

OPENING DEVICE FOR AN ELECTRONIC SHUTTER

The present invention relates to an opening device for an electronic shutter of a camera, and more particularly, relates to an opening device of a program EE type electronic shutter having a mechanical delay for delaying the opening speed of a set of exposure blades.

Many types of electronic shutters are known in the art but they are disadvantageous due to both their large and bulky size as well as their expensive manufacturing costs. In particular, the opening mechanisms incorporated in these prior art shutters are very complicated in construction and their associated delay devices are disadvantegous because they are made up of a complicated train of gear wheels which exhibit uniform motion which is advantageous for some kinds of programs but disadvantageous for other programs in matching with the characteristics of a photoconductive cell. The prior art delay devices are also disadvantageous since in order to obtain the desired shutter opening speed, they employ large inertia pieces or utilize increasing speed and therefore require considerable space. Consequently the prior art delay devices are useable only in conjunction with a special photoconductive cell.

It is therefore a primary object of the present invention to provide a low cost, compact shutter-opening device by eliminating the aforementioned defects.

It is a further object of the invention to provide an opening device for an electronic shutter which is simple in construction, reliable and efficient in operation, and rugged in nature to withstand jarring impacts and other externally applied forces.

The above and other objects of the invention are achieved by providing a camera having an electronic shutter with a shutter-opening device comprised of a turnable opening lever or opening member turnable to effect opening of the shutter, first biasing means for biasing the opening lever in a direction to effect opening of the shutter, and a delay device or retarding means for mechanically delaying the turning movement of the opening lever by applying an opposing biasing force thereto which is weaker than the force exerted by the first biasing means to thereby effect opening of the shutter at a predetermined opening speed.

Having in mind the above and other objects that will be evident from an understanding of the disclosure, the present invention comprises the combinations and arrangements of parts illustrated in the preferred embodiment of the invention which is hereinafter set forth in sufficient detail to enable those persons skilled in the art to clearly understand the function, operation, construction and advantages of it when read in conjunction with the accompanying drawings, wherein like reference characters denote like parts in the various view, and wherein.

Figure 1:
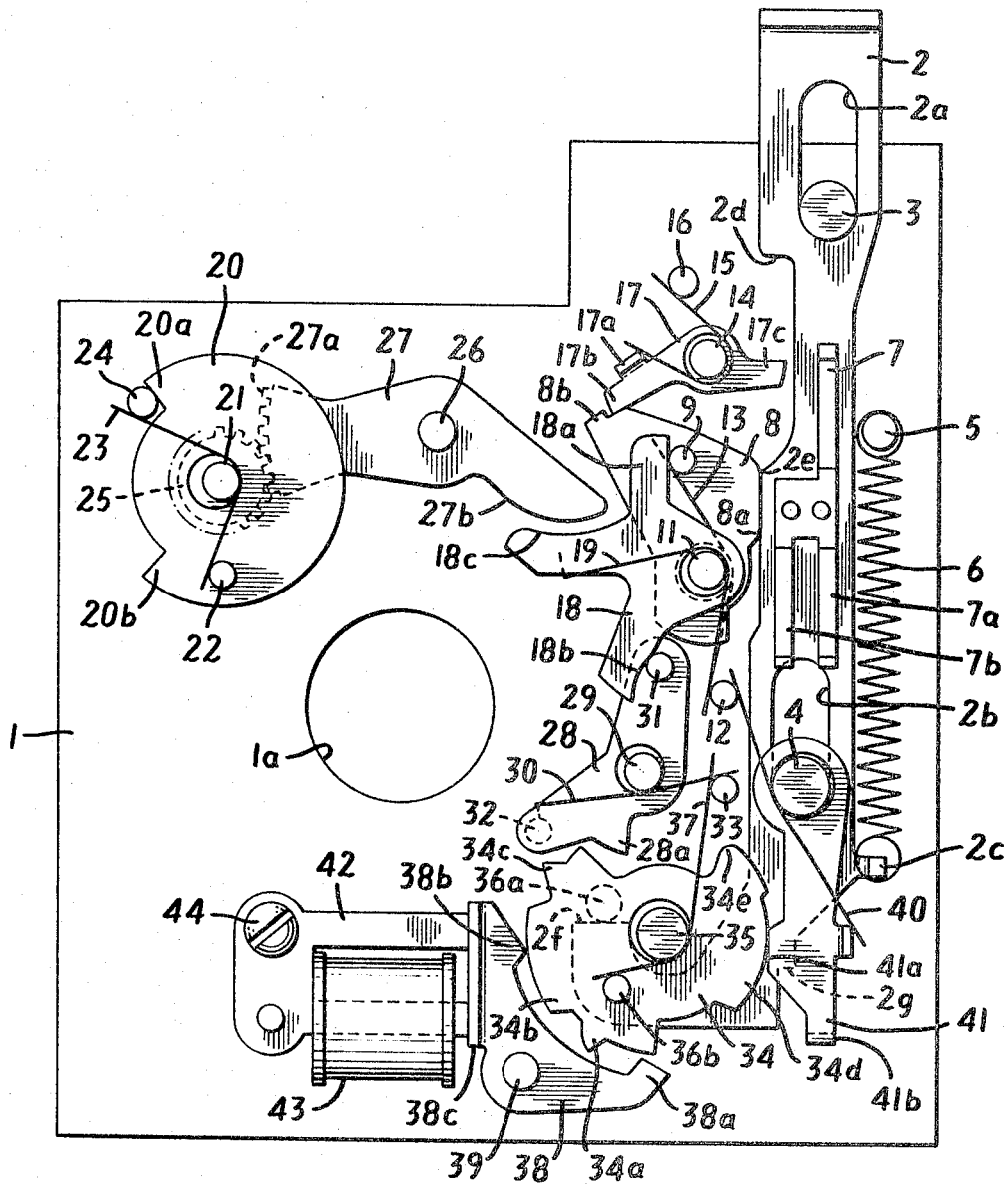
FIG. 1 is a plan view of an opening device according to the invention showing the parts in their cocked or change state.

The opening device is shown in FIG. 1 in its cocked or charged position and the device comprises a base plate 1 supporting thereon the shutter mechanism and having an aperture 1a through its central part. A release plate 2 is movably supported on the base plate for vertical reciprocatory motion by means of guide pins 3a and 3b fixed on the base plate cooperating with guide grooves 2a and 2b provided in the release plate. A tension spring 6 biases the release plate 2 upwardly into the cocked position and the spring is connected at one end to a fixed pin 5 and connected at the other end to a hook portion 2c of the release plate. The release plate 2 also has a first cam 2d, a second cam 2e, a cam 2f and electrical contact pieces 7, 7a, 7b connected thereto at its midportion which will be described hereinafter.

A setting lever 8 is turnably mounted upon a fixed pin 11. A pin 9 is attached to one end of the setting lever and a biasing spring 13 is disposed between the pin 9 and a fixed pin 12 to continuously bias the lever in a clockwise direction about the pin 11. The setting lever 8 has a step portion 8b and a cam portion 8a in camming contact with the second cam 2e of the release plate thereby preventing turning of the setting lever.

A hook lever 17 is mounted for pivotal turning movement about a fixed pin 14 and has a first arm 17b in releasable engagement with the step part 8b. The hook lever is urged in a counterclockwise direction by a spring 15 which is disposed between a fixed pin 16 and a hook portion 17a. The hook lever 17 also has a second arm 17c capable of engaging with the first cam 2d of the release plate.

An opening lever 18 is turnably mounted upon the fixed pin 11 and is continuously urged in a clockwise direction by a biasing spring 19. The opening lever has an arm 18a in releasable engagement with the pin 9 and the spring 19 urges the opening lever 18 into constant engagement with the setting lever 8 through the coaction of the arm 18a and the pin 9. The opening lever 16 also has a first cam 18b and a second cam 18c which will be further described hereinafter.

A wheel 20 is rotatably mounted upon a pin 21 and is always given a counterclockwise turning force by means of a biasing spring 23 which is pressed between a pin 22 on the wheel and a fixed pin 24 on the base plate 1. The wheel 20 has two end stops 20a and 20b which engage with the fixed pin 24 to limit the extent of counterclockwise and clockwise motion of the wheel. A gear 25 is fixed firmly on the wheel and engages with a toothed portion 27a of a gear sector 27. The gear sector is pivotaly mounted upon a pin 26 and has a cam portion 27b engageable with the second cam 18c on the opening lever 18. The wheel 20 has a suitable mass so that the wheel inertia can be harnessed in conjunction with the meshing gear 25 and the gear sector 27 to form a mechanical delay device for controllably delaying the opening of the camera shutter as described hereinafter.

An operating lever 28 is mounted for pivotal movement about a pin 27 and counterclockwise turning force by a spring which is connected at one end of the lever 28 and supported at its other end by a fixed pin 33. A pin 31 is secured to one lever arm of the operating lever 28 and engages with the first cam 18b of the opening lever. Another pin 32 is secured to the underside of the lever arm of the operating lever 28 and engages with a set of shutter exposure blades (not shown) in a well known manner to effect opening and closing of the blades in response to counterclockwise or clockwise movement of the operating lever 28. The operating lever 28 also has a protruding portion 28a which will be described later.

A closing lever 34 is mounted for pivotal turning movement about a fixed pin 35 and is given a counterclockwise turning force by a spring 37. The spring is pressed between a pin 36b on the closing lever and the fixed pin 33 on the base plate 1. A pin 36a projects outwardly from the underside of the closing lever and engages with the arm 2f of the release plate to limit the turning of the closing lever. The closing lever has cam tooths 34a, 34b and 34c which are engageable with projections 38a and 38b of the control lever 38, a cam 34d which is engageable with the protruding part 41a of a lock lever 41, and a protruding part 34e. The lock level 41 is pivotably mounted upon the pin 4 and is urged in a clockwise direction by a spring 40 so that the protruding part 41a engages with the cam 34d. The lock lever 41 also has a riser part 41b which engages with portion 2g of the release lever as described hereinafter.

An electromagnet is provided to control the timing of the closing lever 34 and comprises an iron core 42 which has two legs for use as magnetic poles. One of the legs is wound with a coil 43 and the core 42 is fixed on the base plate 1 with a setscrew 44. A control lever 38 is disposed adjacent the electromagnet and is pivotable about a pin 39. The control lever has an armature 38c magnetically coupled to the iron core 42 and a fork-like arm terminating in projections 38a and 38b engageable with the tooth portions 34a, 34b and 34c of the closing lever 34. When at a standstill, the projection 38b is associated with the upper portion of the tooth 34b of the closing lever 34 so that the armature 38c is drawn near to the iron core 42.

Figure 2:
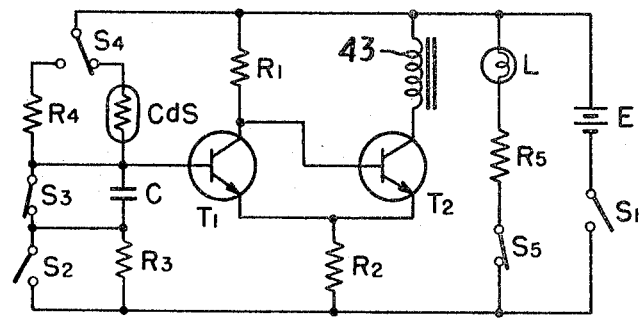
FIG. 2 is a wiring schematic of the electric circuitry used in a camera embodying the invention.

A description will now be given in conjunction with FIG. 2 regarding the electric circuitry useable with the opening device of the present invention.

A photoconductive cell CdS having a variable resistance valve and a condenser C are connected in series with a resistor R3 to an electrical power supply source E with one end connected to the negative side through a switch S1 and the other end connected to the positive side through a mode switch S4. The condenser C is connected in parallel with a normally-closed type switch S3 and the resistor R3 is connected in parallel with a switch S2. The switch S4 selectively connects the remaining circuitry to either a fixed resistor R4 having a fixed preselected resistance value or the photoconductive cell CdS to select the photographic mode of operation of the camera.

The junction point between the photoconductive cell CdS and the condenser C is connected to the base of a transistor T1 and the collector of the transistor T1 is connected to the positive side of the power supply E through a resistor R1 and also to the base of a transistor T2. The emitters of the transistors T1 and T2 are directly coupled to each other and connected to the negative side of the power supply source E through a resistor R2 and the first switch S1. One end of the coil 43 is connected to the collector of the transistor T2 and the other end is connected to the positive side of the power supply E. A miniature lamp L is connected in series with a resistor R5 and a switch S5 and the series circuit is connected across the power supply E.

The operating cycle of the opening device will now be explained assuming that the componets are in their cocked positions shown in FIG. 1. When the release plate 2 is pressed down against the force of the spring 5, the arm 2f of the release plate moves downwardly and the closing lever 34 rotates counterclockwise due to the spring force exerted by the spring 37 thereby causing the pin 36 to follow arm 2f. The contact piece 7a which is fixed on the release plate is equivalent to the switch S1 in the circuit diagram and is closed during initial downward movement of the release plate. Since the switch S5 is still in a closed state, current flows through the lamp L, the resistor R5, the switch S5 and the switch S1 whenever the voltage of the power supply E is above a certain level so as not to hinder the operation of the shutter. The lamp L is thus lit to provide a visual disply ensuring the reliability of the electric supply to the camera user.

If the switch S is then closed, the base of the transistor T1 will be under a voltage divided for the photoconductive cell CdS and the resistor R3 thereby forming a brightness detection circuit because the switch S3 is kept closed and the switch S2 is opened. When the brightness of the subject being photographed is brighter than the required level, the resistance value of the photoconductive cell CdS is small so that the base potential of the transistor T1 is high whereupon the transistor T1 will become conductive. Consequently, the transistor T2 will be nonconductive and the coil 43 is in a deenergized or unexcited state. When the release plate 2 is pressed down more, the closing lever 34 turns further counterclockwise following after that action and the tooth 34a comes into contact with the projection 38a of the control lever 38. Since the electromagnet is not excited, however, the control lever can freely pivot about the pin 39. Therefore the tooth 34a pushes away the projection 38a of the control lever and rotates further counterclockwise.

Just after the tooth 34a passes by the projection 38a, however, the switch S2 is closed by the contact pieces 7b installed on the release plate. Because the switch S3 is still in a closed state at this time, the base of the transistor T1 drops completely to zero potential which causes the transistor to be nonconductive and the transistor T2 to be conductive. Accordingly, the electromagnet is energized or excited and the iron core 42 attracts the armature 38c. Thus, when the closing lever 34 turns further counterclockwise conforming to the pressing down of release plate, the tooth 34b comes in contact with the projection 38a of the control lever 38 causing rotation of the closing lever to be stopped.

On the other hand, the switch S5 is arranged to open just after the tooth 34a gets over the projection 38a of the control lever and therefore it will open when the tooth 34b comes into contact with the projection 38a. Consequently, the lamp L goes out to indicate to the user that the brightness of the subject is bright to the extent of not producing manual vibration of the camera during taking of the picture. Since the protruding 41a of the lock lever 41 is still engaged with the cam portion 34d of the closing lever 34 even when the closing lever 34 is temporarily held stationary, the lock lever 41 remains in the position shown not preventing the release plate 2 from being pressed further down. If the release plate is pressed down more from this state, the arm 21f of the release plate disengages from the pin 36a of the closing lever, and when the shutter closing operation is made, the closing lever is rotated further counterclockwise moving the pin 36a out of the range of the release plate. Also during downward movement of the release plate, the second cam 2e disengages from the cam 8a of the setting lever 8 and moves down to a position where it is free of the release plate during clockwise rotation of the setting lever during the shutter opening operation.

When the release plate is pressed down further, the first cam 2d of the release plate 2 comes into contact with the second arm 17c of the hook lever 17 and cams the hook lever clockwise against the spring force of the spring 15 thereby disengaging the first arm 17b from interlocking relation with the step portion 8b of the setting lever. The setting lever 8 then begins to rotate clockwise due to the spring force of the spring 13. Simultaneously and synchronously with the rotation of the pin 9 which is connected to the setting lever 6, the opening lever 18 also starts turning clockwise due to its own spring force exerted by the spring 18. Since the second cam 18c of the opening lever is in camming contact with the cam portion 27b of the gear sector 27, the motion of the opening lever 18 is controlled by the inertia of the wheel 20 and by the force of the biasing spring 23 acting through the gear wheel 25 and the gear sector which jointly comprise the delay device for delaying the motion of the opening lever 18 in a controlled manner. Therefore the opening lever turns in the clockwise direction at a speed slower than that of the setting lever 8. The spring force exerted by the biasing spring 23 is weaker than that exerted by the biasing spring 19 so that the opening lever 18 will be sufficiently biased by the spring 19 to turn about the pin 11 and effect opening of the shutter blades. The spring force exerted by the spring 23 acts through the meshing gear 25 and gear sector 27 and is transmitted to the cam portion 27b which thereby exerts an opposing biasing force on the opening lever 18 in a direction opposite to that exerted by the spring 19.

In accordance with the invention, the spring force exerted on the opening lever and that exerted on the wheel 20 are acting on each other in a cancelling or opposing direction and the second cam 18c of the opening lever and the cam portion 27b of the gear sector are designed to increase the speed ratio to their displaced positions thereby controlling the wheel inertia beyond its usual capacity.

In response to clockwise motion of the opening lever 18, the operating lever 28 having pin 31 in camming contact with the first cam 18b of the opening lever begins to turn counterclockwise by its own spring force following after the motion of the opening lever 18. The movement of the operating lever 28 in the counterclockwise direction effects opening of the set of shutter exposure blades through the pin 32 in a manner well known in the art. As aforementioned, however, the movement of the opening lever 18 in the clockwise direction is delayed by the delay device and consequently the opening of the camera shutter is controlled so that the opening area can be increased in a predetermined relation to the elapsing of time.

The operation of the electric circuit will now be described starting with the charging of photocurrent from the photoconductive cell CdS to the condenser C upon the opening of the switch S3 when the setting lever 8 is turned clockwise. The first cam 18b of the opening lever 18 is in camming contact with the pin 31 so that the operating lever begins to rotate counterclockwise by its own spring force 30 while the pin 31 follows after the cam 18b. The opening device starts in this way with the opening lever just beginning to rotate at a speed determined only by its own inertia at the early stage. When it has been displaced through a given angle, the second cam 18c of th opening lever then comes into contact with the cam portion 27b of the gear sector 27 and the opening lever causes the gear sector 27 to rotate counterclockwise against the force of the biasing spring 23 and therefore rotation of the opening lever is delayed. Accordingly, the set of exposure blades related with the opening lever are opened with the speed of the opening lever, i.e., the opening area is controlled during the opening stroke in a given relation to an elapse of time.

Figure 3:
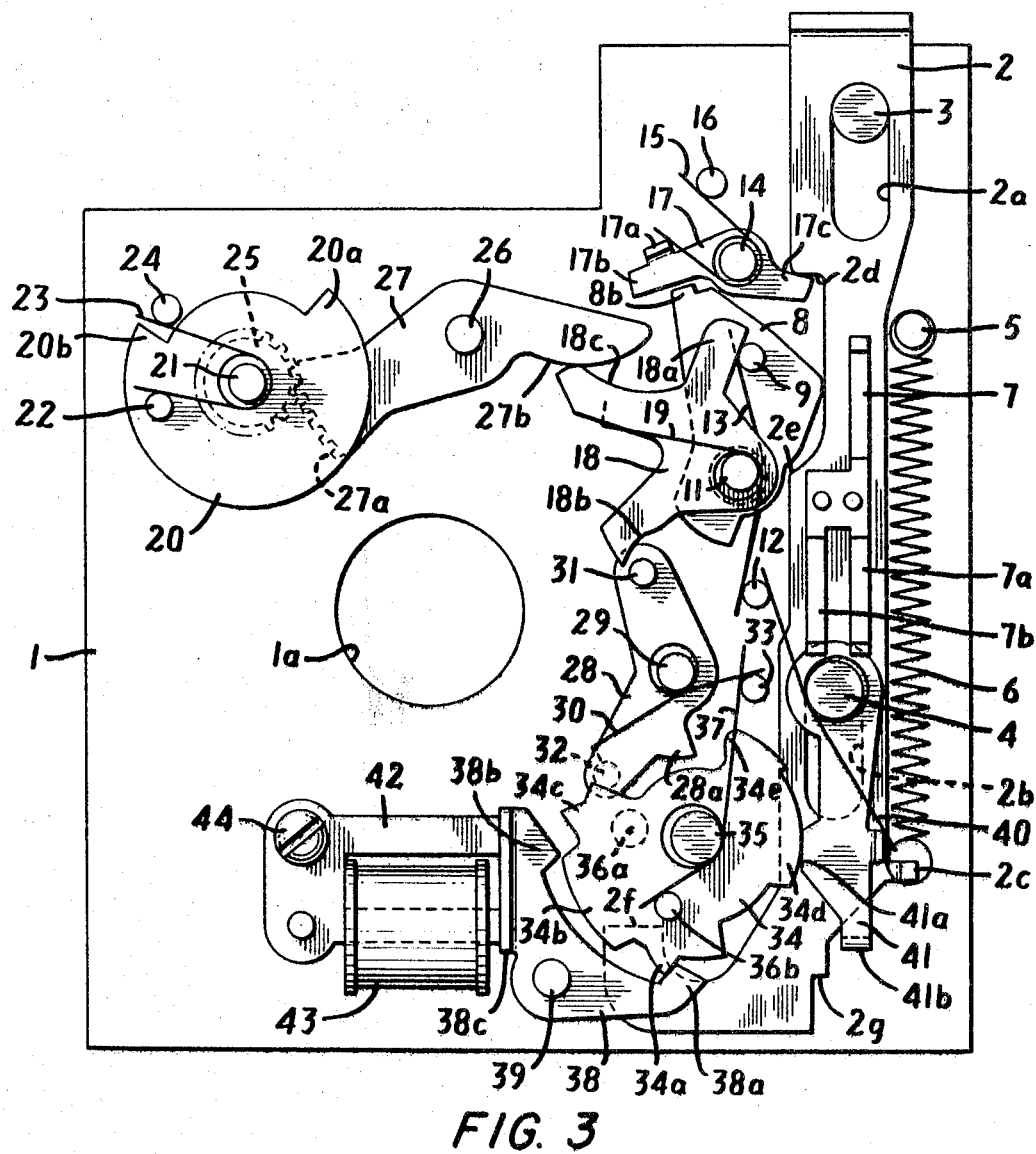
FIG. 3 is a plan view similar to FIG. 1 but showing the parts in an operating state.
Figure 4:
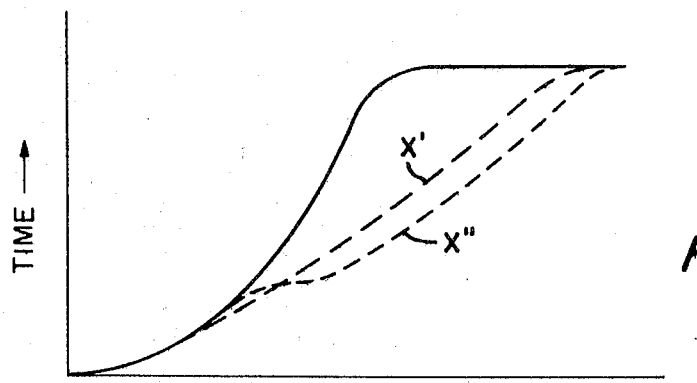
FIG. 4 is a graph depicting the relationship between the opening area of the shutter with time.

The shutter opening waveform is described in the graph shown in FIG. 4 wherein the ordinate represents time and the abscissa represents the opening area of the shutter blades. The solid line curve shows the opening stroke for the case in which the operating lever is released merely under a state where no control mechanism acts upon it and causes the shutter blades to open only by its own force. The shutter opening in this case is chiefly determined by the inertia of the blades. On the contrary, in accordance with the invention, the opening of the shutter blades is delayed by the delay device as indicated by dotted lines in the graph. This waveform, though varied depending upon the particular program, forms almost a straight line as shown by the dotted line X' for one type of program, and for another type of program, it forms a discontinuous line as shown by the dotted line X'' for successively matching with a characteristic of the photoconductive cell CdS. Thus, the shutter blades open and assume the state shown in FIG. 3.

After an elapse of time determined by the intensity of the light impinging on the photoconductive cell and assuming that the brightness of the subject is above the required level, the charging voltage of the condenser C rises to a given level and then the transistor T1 becomes conductive and the transistor T2 becomes nonconductive. By this operation, the electromagnet becomes demagnetized and no longer attracts the control lever 38 thereby allowing the closing lever 34 to move. The closing lever 34 rotates further counterclockwise from the state shown in FIG. 3 by its own spring force causing the tooth 34a to come into contact with the projection 28a of the operating lever and causes the lever to rotate clockwise against the force of the spring 30, thereby completing closure of the exposure blades. The shutter diaphragm and the time in seconds can then be determined simultaneously in dependence upon the brightness of the light.

When the closing lever is rotated to a closing position, the cam 34d is also rotated, and as a result, the protruding part 41a of the lock lever 41 falls into the lower portion of the cam 34d. In this state, the release plate 2 is releasably locked and held in the completely pressed-in or depressed state. After completion of the photographing, the release plate 2, when set free from its pressed-in state, starts returning in the upward direction by its spring force.

At an early stage of the release lever return movement, the cam 2e of the release plate comes into contact with the cam 8a of the setting lever and causes it to rotate counterclockwise against the force of the spring 13 and also effects counterclockwise motion of the opening lever 18 through the pin 9. As the cam 2d of the release plate releases the hook lever 17, the hook lever returns by its own spring force and falls into the step 8b to lock the setting lever in its cocked position.

At the same time, the wheel 20 and the gear sector 27 return to their initial state by the force of the spring 23. When the setting lever 8 is nearly returned in this way, the arm 2f of the release plate comes into contact with the pin 36a of the closing lever and causes the closing lever to rotate clockwise against the spring 37 and further allows the lock lever 41 to return, whereby all the mechanisms are returned to their charged or cocked state as shown in FIG. 1.

Now an explanation will be given assuming that the brightness of the subject is below the required level. When the switch S1 is closed upon pressing down of the release plate 2, the switch S3 is closed and the switch S2 is in an open state. Therefore, the voltage of the transistor T1 will be of a divided value of the power source voltage and will have a voltage determined by the photoconductive cell CdS and the resistor R3. In this case, the resistance value of the photoconductive cell CdS is greater than a predetermined level so that the base potential of the transistor T1 is low whereby the transistor T1 is nonconductive and the transistor T2 is thereby placed in a conductive state. Accordingly, the electromagnet is excited and attracts the armature 38c of the control lever 38.

If the release plate is pressed down more, the closing lever 34 is rotated counterclockwise and stops at a position where the tooth 34a is in contact with the projection 38a of the control lever. When the release plate is pressed down further, the switch S2 will be closed. However, since the closing lever 34 is still stopped at the aforementioned position with no change occurring in the operating condition of the transistor circuits, the switch S5 maintains closed and the lamp L keeps on lighting. If the release plated is pressed down more still further, the cam 2d causes the hook lever 17 to rotate clockwise and the shutter will be released to open the set of shutter exposure blades as aforementioned and the charging of photocurrent to the condenser C will commence. The condition of the components at this time is shown in FIG. 3.

After an elapse of time determined in dependence upon the intensity of the impinging light, the charging voltage of the condenser attains a given voltage and the transistor T1 will be conductive and the transistor T2 will be nonconductive. The electromagnet is thus deenergized and the control lever 38 releases the closing lever 34 which proceeds to close the set of exposure blades thereby completing the automatic exposure photographing. Since the switch S5 is made to open simultaneously by the counterclockwise rotation of the closing lever 34, the lamp L goes out indicating compleltion of the photographing. However, if the lamp remains lighted just before the shutter release operation after pressing down the release plate, this indicates that flashlight photographing is recommended since the exposure time will be so long that manual vibration of the camera is likely to occur.

In order to effect flashlight photographing, the diaphragm is adjusted by a well known method and the mode switch S4 is actuated to connect the fixed resistor R4 to the circuit instead of the photoconductive cell thereby synchronizing the exposure timing with the flashlight device. The shutter operation is carried out in a manner similar to that described above. However, when no power supply source E is provided or the electromagnet does not operate for some reason, the downward movement of the release plate causes the closing lever 34 to rotate counterclockwise and when the tooth 34b gets over the projection 38a of this control lever, the protruding part 41a of the lock lever falls into the lower step of the came 34d after which the lock lever 41 rotates clockwise by its own force. As a result, the riser part 41b of the lock lever moves within the operating range of the release plate. When the release plate is pressed down further after that, the protruding part 2g of the release plate comes into contact with the riser part 41b thus preventing the release plate from being pressed down further. This effectively prevents mistaken photographing and indicates that the camera is out of operation for some reason.

In accordance with the present invention, the desired shutter opening pattern required for program E E type photography can readily be obtained. The shutter opening operation is carried out with a delay device operating in conjunction with the displacement of the opening lever. The dealy device is very compact because the braking capacity of the delay device, for example, the inertia capacity of wheel, etc., is efficiently utilized thereby enabling the entire shutter assembly to be manufactured at a relatively low cost.

The invention has been described in conjunction with one preferred embodiment and many other modifications will become apparent to those skilled in the art and the present invention includes all such modifications falling within the scope and spirit of the invention as described in the appended claims.

What we claim is:

1. In a camera having an electric shutter movable from a closed state to an open state and back to said closed state to effect an exposure: opening means for opening said shutter to initiate an exposure comprising an opening member having one position corresponding to that wherein said shutter is closed and turnable in one direction from said one position to effect opening of said shutter, means for releasably locking said opening member in said one position, first biasing means biasing said opening member in said one direction with a first biasing force sufficient to effect turning of said opening member in said one direction when said opening member is unlocked to thereby effect opening of said shutter, and retarding means engageable with said opening member, means for spacing said retarding means from said opening member with a predetermined distance when the opening member is in said one position so that said opening member is started without relation with said retarding means when said opening member is unlocked and said opening member is engaged with said retarding means and retarded by said retarding means during moving of said opening member when said opening member moves through said predetermined distance from said one position, and closing means for closing said shutter to complete said exposure.

2. A camera according to claim 1; wherein said delay means comprises a rotatable toothed gear, a pivotable gear sector having a toothed portion in mesh with said toothed gear and a cam portion, a pivotable driving member having one arm in camming contact with said opening member and another arm engageable with said cam portion of said gear sector in response to turning of said opening member through said given angular distance, and second biasing means for biasing said toothed gear in one rotational direction to apply a second biasing force weaker than said first biasing force through said gear sector and said driving member to said opening member in a direction effective to oppose the opening of said shutter whereby said first biasing force effects pivotal movement of said driving member and said gear sector and rotation of said gear against the opposing action of said second biasing force.

3. A camera according to claim 2; wherein said retarding means includes a rotatable wheel connected for rotation with said toothed gear and having a preselected mass effective to offer inertial resistance to rotation of said wheel to obtain opening of said shutter at said predetermined opening speed.

4. A camera according to claim 3; wherein said second biasing means comprises a biasing spring coacting with said wheel for biasing said toothed gear in said one rotational direction.

* * * * *